United States Patent Office 3,124,614
Patented Mar. 10, 1964

3,124,614
PREPARATION OF 2-SUBSTITUTED
CYCLOHEXANONES
Lester J. Dankert, Ingersoll Township, Midland County, Mich., and Daniel A. Permoda, Warwick, Va., assignors to The Dow Chemical Company, Midland, Mich., a corporation of Delaware
No Drawing. Filed Apr. 7, 1958, Ser. No. 726,614
3 Claims. (Cl. 260—586)

This invention relates to the preparation of 2-substituted cyclohexanones and especially of such cyclohexanones substituted in the 2-position with an alkyl group having at least three carbon atoms or with a cyclohexyl group and unsubstituted in the 6-position. It particularly pertains to the preparation of such 2-substituted cyclohexanones by direct catalytic hydrogenation of o-substituted monohydric phenols wherein the ortho-substituent is an alkyl group having at least three carbon atoms or is a cyclohexyl group and wherein only one of the positions ortho to the phenolic hydroxyl group is substituted. In another aspect, the invention pertains to new and useful compositions of matter in 2-sec-butylcyclohexanone and peppermint-odored compositions comprising the same.

It is known that, during the catalytic hydrogenation of phenols, there can be observed intermediate reaction products that respond to tests for cyclohexanones. However, only occasionally can hydrogenation of phenol reactions be interrupted and useful yields of the intermediate cyclohexanone products be recovered from such reaction mixtures.

In one aspect, it is among the objects of this invention to provide method and means for obtaining certain 2-substituted cyclohexanones, more particularly ones in which the 2-substituent is an alkyl group having at least three carbon atoms or a cyclohexyl group and in which the 6-position is not substituted. A more particular object is to provide such method and means for obtaining the 2-substituted cyclohexanones by direct catalytic hydrogenation of o-substituted monohydric phenols wherein only one of the positions ortho to the phenolic hydroxyl group is substituted and that with an alkyl group having at least three carbon atoms or a cyclohexyl group. A still more particular object is to provide such a method whereby the phenolic starting material is substantially converted to the cyclohexanone product and whereby the latter can be obtained in good yield and good quality.

In another aspect, an object of this invention is to provide new compositions of matter in 2-sec-butylcyclohexanone, peppermint-odored compositions comprising the same, and mixtures thereof with natural oil of peppermint.

Other objects and advantages of the invention will be evident in the following description.

The objects of this invention have been attained as set forth in detail hereinafter by catalytic hydrogenation of certain phenolic compounds in liquid phase with hydrogen in intimate contact with hydrogenation-active palladium catalysts.

The phenolic starting materials with which the present invention is concerned are monohydric phenol compounds wherein one and only one of the positions ortho to the phenolic hydroxyl group is substituted and that with an alkyl group having at least three carbon atoms or a cyclohexyl group. Such phenolic starting materials can be represented by the formula

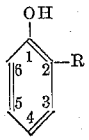

wherein the symbol R represents an alkyl group having at least three carbon atoms or a cyclohexyl group. The nucleus of such phenols can further be substituted, e.g. with alkyl groups, in one or more of the 3-, 4-, or 5-positions, but not in the 6-position. Specific examples of such o-substituted phenols are o-isopropylphenol, o-sec-butylphenol, o-tert-butylphenol, o-tert-amylphenol, o-cyclohexylphenol, thymol (2-isopropyl-5-methylphenol), 2,4-di-sec-amylphenol, and 2,4-di-tert-butyl-5-methylphenol.

From such phenolic starting materials and in accordance with this invention there are obtained 2-substituted cyclohexanone products, for example, 2-isopropylcyclohexanone, 2-sec-butylcyclohexanone, 2-tert-butylcyclohexanone, 2-tert-amylcyclohexanone, 2-cyclohexylcyclohexanone, 2-isopropyl-5-methylcyclohexanone, 2,4-di-sec-amylcyclohexanone, and 2,4-di-tert-butyl-5-methylcyclohexanone. Uses for such cyclohexanone materials, e.g. as solvents for lacquers and plastics, are already known.

The catalyst employed in the practice of the method of this invention is one containing elemental palladium in extremely fine state of subdivision, preferably supported in and on adsorbent charcoal although other solid supporting materials can be employed such as calcium carbonate, barium sulfate, magnesia, diatomaceous earth, pumice, or kieselguhr.

Supported palladium catalysts containing from 1 to 10 percent by weight of the active metal are very satisfactory although catalysts containing more or less than such proportions of active metal can also be employed. Palladium hydrogenation catalysts of this kind are known per se and are commercially available. The catalyst is usually employed in amounts corresponding to from 0.01 to 0.5, preferably from 0.05 to 0.1, percent by weight of active palladium metal based on the weight of phenolic starting material. For a supported catalyst, e.g. a palladium-on-carbon catalyst, containing 5 percent by weight of active palladium metal, these proportions correspond to from 0.2 to 10, preferably from 1 to 2 percent by weight of the supported catalyst based on the weight of starting phenol.

The catalytic hydrogenation is usually carried out by dispersing the palladium hydrogenation catalyst in the phenolic starting material in liquid form. Normally solid phenols can be melted for this purpose or can be dissolved in hydrogenation-inert liquid solvents such as benzene, toluene, octane, methanol, ethanol, or dioxane, although a solvent is not essential and is not usually employed.

In practice, the phenolic starting material, together with the palladium-containing catalyst, is charged into a pressure-resistant hydrogenation vessel which may be of any conventional design and construction. Space in the vessel is allowed for maintaining a gas phase containing hydrogen. The liquid mixture is agitated and heated to a hydrogenation reaction temperature. Hydrogen gas is supplied to the gas space and mixed with the catalyst-containing liquid reaction mixture.

During the hydrogenation reaction, the temperature of the reaction mixture is usually maintained at from 100° to 300° C., preferably from 150° to 250° C., and hydrogen is maintained in the reaction vessel under a total reactor pressure of at least three atmospheres absolute pressure. Any available higher pressure can be used, although the reaction is readily carried out at pressures between 100 and 1000 pounds per square inch gauge.

The hydrogenation reaction is continued under the foregoing conditions until hydrogen has been consumed in approximately the theoretical amount to convert the phenolic starting material to a cyclohexanone product, i.e. approximately two moles of hydrogen per mole of the phenolic starting material. In most instances the reaction automatically stops when the specified phenolic starting material has been substantially converted to the specified 2-substituted cyclohexanone product since the latter is not readily further hydrogenated under the conditions just described.

After the hydrogenation reaction stops or is stopped, the reaction mixture is usually cooled, the excess gas is vented off, and the liquid reaction mixture is withdrawn from the reactor and filtered to separate the solid catalyst. The recovered catalyst can usually be reused or salvaged for use in other ways.

The hydrogenation reaction product obtained as just described contains a 2-substituted cyclohexanone, usually in large proportion, e.g. corresponding to from 75 to 95 percent or more of the whole reaction product, the yield of 2-substituted cyclohexanone, based on the starting phenolic compound, being almost quantitative in many instances. Usually, the reaction product contains only small proportions of unreacted phenolic starting material and of cyclohexanol reaction products. In many instances and for some purposes, the filtering reaction products containing a high proportion of 2-substituted cyclohexanones can be used per se and without further purification. The 2-substituted cyclohexanones can be separated from the small proportions of other constituents in the reaction product by usual means, e.g. by fractional distillation.

The following examples illustrate the method of this invention but are not to be construed as limiting its scope.

EXAMPLES 1–7

In each of a number of separate experiments identified as Examples 1–7 in Table 1, a nuclear-substituted (o-alkyl)phenol as indicated in the table was charged to a pressure-resistant autoclave together with a catalytic amount of a finely powdered hydrogenation catalyst containing 5 percent by weight of palladium deposited on activated charcoal. In each instance, the mixture was agitated, heated to a reaction temperature, and treated with hydrogen under the conditions of temperature and pressure indicated in Table 1. In each instance, the reactions stopped when an amount of hydrogen corresponding to approximately two moles thereof per mole of the starting phenol had been used up. Thereafter, the reaction mixtures were cooled and the unused gas was released. The liquid reaction products were removed from the autoclave and filtered to remove the catalyst. The filtered liquid reaction product was then analyzed by conventional procedure to determine the proportion of the 2-alkylcyclohexanone therein with results as shown in the table as assay in percent by weight.

In the Table 1, the weight of the catalyst is that of the whole mixture of palladium and charcoal, and the reaction pressure is in pounds per square inch gauge (p.s.i.g.).

In place of the phenolic starting materials used in Examples 1–7 there can be used one of the o-alkylphenol starting materials hereinbefore defined with formation of the corresponding 2-alkylcyclohexanone. The reaction conditions can be varied within the scope hereinbefore set forth with substantially the same results.

When such phenolic starting materials are hydrogenated in the procedural manner set forth above but in contact with active nickel catalysts, the hydrogenation products are cyclohexanols instead of the desired cyclohexanones. For purposes of illustration, 250 grams of 2-sec-butylphenol was hydrogenated with hydrogen at 170° C. and 200 pounds per square inch gauge pressure in contact with 10 grams of a finely divided commercial hydrogenation catalyst containing approximately 25 percent by weight of nickel. After filtration, the liquid reaction product was analyzed and found to contain 86 percent by weight of 2-sec-butylcyclohexanol and some unreacted phenol.

*Table 1*

| Example No. | Starting Phenol | | Catalyst | Reaction Conditions | | Filtered Liquid Product | |
|---|---|---|---|---|---|---|---|
| | Kind | Weight | | Temp., ° C. | Pressure, p.s.i.g. | Assay, percent | 2-Alkylcyclohexanone |
| 1 | o-isopropylphenol | 136 g | 2.7 g | 175 | 175–200 | 96 | 2-isopropylcyclohexanone. |
| 2 | o-sec-butylphenol | 300 g | 6 g | 175–180 | 175–200 | 99 | 2-sec-butylcyclohexanone. |
| 3 | ----do---- | 20 lbs | 0.2 lbs | 183–184 | 200 | 98 | Do. |
| 4 | o-tert-amylphenol | 328.5 g | 6.6 g | 175 | 200 | 84 | 2-tert-butylcyclohexanone. |
| 5 | o-cyclohexylphenol | 440 g | 4.4 g | 150 | 100–200 | 95 | 2-cyclohexylcyclohexanone. |
| 6 | ----do---- | 15 lbs | 0.15 lbs | 189 | 200 | 94 | Do. |
| 7 | Thymol | 225 g | 4.5 g | 175 | 175 | 98 | 2-isopropyl-5-methyl-cyclohexanone. |

EXAMPLE 8.—PREPARATION OF 2-SEC.-BUTYLCYCLOHEXANONE

Into an electrically heated stirred autoclave were placed 250 grams of o-sec-butylphenol and 10 grams of a finely powdered hydrogenation catalyst containing 5 percent by weight of palladium deposited on activated charcoal. The air in the autoclave was displaced by hydrogen, and the charge was heated to 170° C. The hydrogenation was carried out at 170° C. and with a pressure of 200 pounds per square inch gauge until hydrogen absorption substantially ceased, after which the autoclave was cooled, vented, and opened. The reaction product was filtered to collect the catalyst, and the filtered liquid was obtained in amount corresponding to substantially theoretical yield.

The liquid filtrate was color-distilled through a short column. A small fore-cut containing hydrocarbons was taken off, and a small tarry residue remained, with 93 percent of the weight of the distillation charge being collected in the main distillate cut. This cut was analyzed and found to contain 94 percent by weight 2-sec-butylcyclohexanone and 6 percent by weight 2-sec-butylcyclohexanol; no phenol was found.

A portion of the 2-sec-butylcyclohexanone product was redistilled through a four-foot long packed column at a reflux ratio of five to one at a reduced pressure of 0.7 mm. of mercury absolute. A middle distillate cut was taken at 48° C. This cut was analyzed and found to contain 99.4 percent by weight 2-sec-butylcyclohexanone and 0.6 percent by weight of 2-sec-butylcyclohexanol.

2-sec-butylcyclohexanone is a colorless liquid at room temperature and has these properties:

Boiling point=48° C. at 0.7 mm. mercury, absolute pressure
Specific gravity 25°/15.5° C.=0.912
Refractive index 25° C./D=1.4565

2-sec-butylcyclohexanone has true odor of fresh oil of peppermint. It can be used in place of natural oil of peppermint in preparation of peppermint-odored compositions. It can be compounded with natural oil of peppermint in any proportions to produce blends.

The 2-sec-butylcyclohexanone keeps its clear peppermint odor during evaporation whereas natural oil of peppermint tends to develop a "woody" odor. Blends of 2-sec-butylcyclohexanone with natural oil of peppermint, preferably ones containing more than one volume of 2-sec-butylcyclohexanone per volume of the natural peppermint oil, are advantageous in helping the latter to keep a clean, fresh peppermint odor during evaporation.

For example, a blend of equal volumes of 2-sec-butylcyclohexanone and fresh natural oil of peppermint was prepared. Strips of perfumer's blotting paper were separately dipped into the pure 2-sec-butylcyclohexanone, into the blend with natural oil of peppermint, and into the natural oil of peppermint, respectively, and were allowed to dry out in air. The blotter strips with the pure 2-sec-butylcyclohexanone and the blend thereof with the oil of peppermint kept a clear peppermint odor as long as the odor was detectable, whereas the strip containing the natural oil of peppermint alone developed a "woody" note as the oil evaporated.

2-sec-butylcyclohexanone can also be used in blends with natural oil of spearmint although such blends preferably contain more than one volume of natural oil per volume of 2-sec-butylcyclohexanone.

EXAMPLE 9

To illustrate useful compositions of matter comprising 2-sec-butylcyclhexanone as an essential constituent, a disinfectant concentrate was prepared containing the following ingredients, parts being by weight.

| | Parts |
|---|---|
| 2-phenylphenol, mixture of 4- and 6-chloro- | 5 |
| Potassium fatty acid soap | 4 |
| Isopropyl alcohol | 15 |
| Water | 72 |
| 2-sec-butylcyclohexanone | 2.5 |
| Terpineol | 0.7 |
| Methyl salicylate | 0.5 |
| Oil of peppermint | 0.3 |
| | 100 |

In use, one part of the foregoing concentrate is dispersed in approximately 70 parts of water and the resulting solution is employed as a disinfectant wash, e.g. in household cleaning of walls, floors, and furniture, imparting a desirable "fresh and clean" odor to the treated area.

That which is claimed is:

1. A method for the preparation of 2-alkylcyclohexanones which comprises catalytically hydrogenating an o-alkyl monohydric phenol wherein one and only one of the positions ortho to the phenolic hydroxyl group is substituted, the substituent being selected from the class consisting of alkyl groups having at least three carbon atoms and the cyclohexyl group, with hydrogen at pressure of at least three atmospheres absolute and temperatures of from 100° to 300° C. in contact with an active palladium catlayst containing palladium in amount corresponding to at least 0.01 percent by weight of the starting phenol, and continuing the hydrogenation reaction until the phenol starting material is substantially reacted.

2. A method for the preparation of 2-sec-butylcyclohexanone which comprises catalytically hydrogenating o-sec-butylphenol with hydrogen, maintaining the reaction mixture at pressures of at least three atmospheres absolute and at temperatures of from 150° to 250° C. in contact with an active palladium catalyst containing palladium in amount corresponding to from 0.05 to 0.5 percent by weight of the starting phenol, and continuing the hydrogenation reaction until the o-sec-butylphenol is substantially consumed.

3. 2-sec-butylcyclohexanone.

References Cited in the file of this patent

UNITED STATES PATENTS

| | | |
|---|---|---|
| 1,882,200 | Steimming | Oct. 11, 1932 |
| 2,443,015 | Whitaker et al. | June 8, 1948 |
| 2,549,520 | Prichard | Apr. 17, 1951 |
| 2,710,825 | Lazier | June 14, 1955 |
| 2,773,099 | Stork | Sept. 3, 1956 |
| 2,829,166 | Joris | Apr. 1, 1958 |

OTHER REFERENCES

Beilstein: Handbuch der Organischen Chemie, vol. 7 (2nd Supplement), page 36 (1948).